United States Patent [19]
Andrews et al.

[11] 3,939,579
[45] Feb. 24, 1976

[54] INTERACTIVE AUDIO-VISUAL INSTRUCTION DEVICE

[75] Inventors: Lawrence Paul Andrews, Manassas; Raymond Graham Fox, Warrenton; Clayton Potter Ludeman, Manassas, all of Va.; Thomas Wilbur Rounds, Jr., Endwell, N.Y.; Victor Anthony Scuderi, Gaithersburg, Md.; Douglas Howard Strait, Vienna, Va.

[73] Assignee: International Business Machines Corporation, Armonk, N.Y.

[22] Filed: Dec. 28, 1973

[21] Appl. No.: 429,308

[52] U.S. Cl. ............................ 35/9 A; 35/48 R
[51] Int. Cl.² ........................................ G09B 7/04
[58] Field of Search.......... 35/6, 8 R, 8 A, 9 R, 9 A, 35/9 B, 35 C, 48 R

[56] References Cited
UNITED STATES PATENTS

| | | | |
|---|---|---|---|
| 3,141,243 | 7/1964 | Chapman et al. | 35/9 A |
| 3,300,877 | 1/1967 | Feder | 35/9 A |
| 3,501,851 | 3/1970 | Price et al. | 35/9 A |
| 3,608,208 | 9/1971 | Willardson | 35/9 A |
| 3,660,912 | 5/1972 | Laplume | 35/9 A |
| 3,718,986 | 3/1973 | Hewitt | 35/9 A |

*Primary Examiner*—Paul E. Shapiro
*Assistant Examiner*—Vance Y. Hum
*Attorney, Agent, or Firm*—Delbert C. Thomas

[57] ABSTRACT

This disclosure is for an Audio-Visual training device having both a projectable film tape and an audio tape with control indicia on the audio tape in addition to recorded audio messages. The tape indicia are used to control a small processor which governs both tape and film movement. A keyboard on the device is used to enter replies to queries to a user from the tape and film and the processor will determine both tape and film movement in response to the answer to a query. The system is capable of multiway branching to present to the viewer the proper information pertaining to his answer. Several counters are available to count trials, correct or incorrect responses, etc., and to control tape and film movement in accordance with the counter readings. A proctor light may be turned on to call for personal assistance and to lock up the machine when a student is in trouble and the program does not have the proper branch to clear up the difficulty.

2 Claims, 11 Drawing Figures

FIG. 11
FIG. 10
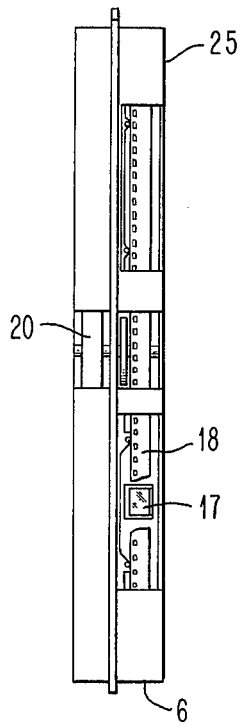
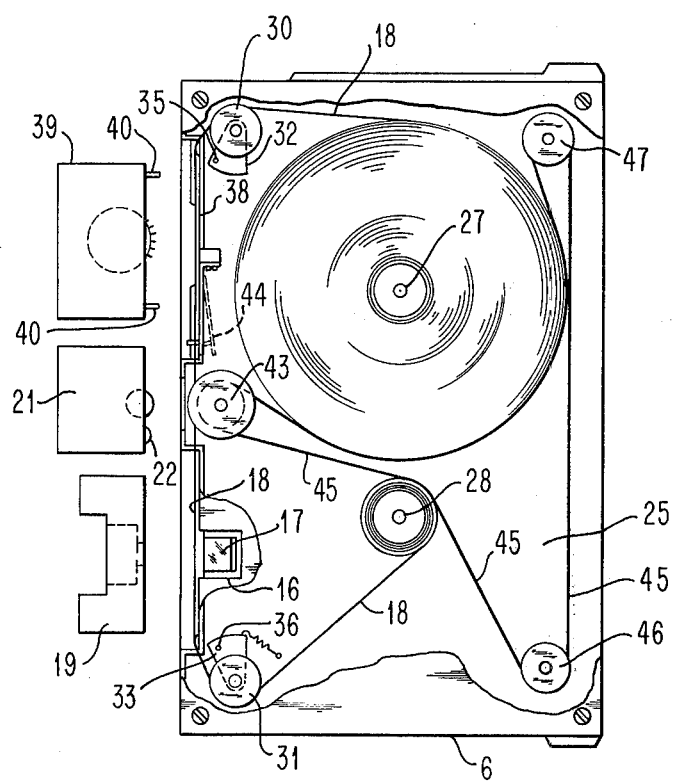

INTERACTIVE AUDIO-VISUAL INSTRUCTION DEVICE

OBJECTS OF THE INVENTION

The goal of efficient and effective unattended audio-visual education has been present for a long time but has been unobtainable due to the required provisions needed to accommodate the different possible responses to queries. Many devices which provide coordinated audio and visual presentations are available in the prior art and some even provide limited audio branching in response to a student's answer, e.g., one sound track for a correct answer and another track for an incorrect response. However, no educational devices have been available, except perhaps as terminals connected to large expensive computers, which provide coordinated audio and visual programs for a subject with separate programs for any likely response and/or with corrective routines for any incorrect response.

The present invention is embodied in a self-contained audio-visual instruction device having both an audio tape and an indexible film projector with coordinated materials, a display panel on which a student's reply may be assembled before it is tested and a student's keyboard to enter data into the controls for the device. The audio tape contains information channels which control movement of film to enable changes during an audio message, or a movable display synchronized with the audio. The audio tape also contains control information which can enable a control mechanism to stop the tape and await a student's response. After a response, the control information is used to continue instructions in one of up to five different branches as determined by the student's answer. An answer can be entered by use of one of five multiple choice keys, by one of the keys of an alpha-numeric keyboard or by a sequence of key operations which can be assembled and indicated on a display panel.

It is then an object of this invention to provide an educational device which is capable of wider utility and more comprehensive training than devices presently available.

It is another object of the invention to devise an educational aid which is flexible in that it provides many alternate paths from any query in accordance with the learning level and ability of the student.

Still another object is to provide a combined audio tape — visual film instructional device wherein the presentation of a visual sequence of frames is under control of data recorded on the audio tape in synchronism with the audible information thereon.

A further object is to provide an educational device with a display panel on which may be displayed a multi-character response entered from an attached keyboard in response to a selected instruction.

A still further object is the development of an audio-visual device in which the movement of the audio and visual record carriers is under control of a central logic area.

Another object is to provide such a central logic area with counters synchronized with the movement of the audio and visual carriers to maintain a record of the present status of such record carriers.

Still another object is the provision of logic control information in one of said records along with the recorded information with such logic control information being transferred into the logic control mechanism for selective control thereof in accordance with the responses to be entered from the control keyboard.

A still further object is to develop a visual display device synchronized with an audio message by the use of display control information recorded along with the audio message and in which further device control information and signals are also recorded with the audio message.

Other objects and features of the invention will be apparent in the following description and appended drawings of a preferred embodiment of our invention.

BRIEF DESCRIPTION OF THE DRAWINGS

FIG. 3 is a block diagram of the components of the invention.

FIG. 10 is a side view of the projectable film part of the tape cassette.

FIG. 11 is an end view of the cassette showing the relation of the visual and audio tape sections.

GENERAL DESCRIPTION

The preferred embodiment of our invention as set out in the appended drawings is a combined audio-visual unit having an audio tape and a projectable film with an independent forward-reverse drive for each. The audio part has a recording tape with some channels having audio statements recorded thereon and other channels with digital recordings to indicate the start and end of each of the audio statements and to control movement of the film. The drive capstans for this tape can be controlled to move the tape forward or back at high speed to a selected message and then forwardly at a slow speed to read out the message. The visual film tape has sprocket holes and is driven by a stepper motor in either direction at any of several speeds. In a forward direction, a speed can be selected for single frame showing, animation at about 6 frames per second, motion at about 3 times that speed and lip synchronized motion at about 4 times the animation speed. In addition, there is a high speed forward and reverse drive to bring the film to a selected starting point.

A keyboard is provided to enter data and responses to queries and the keyboard entry is displayed on a small gas panel matrix unit. Counters are provided internally to keep a record of a user's progress in using the device. The frames of the visual tape are projected onto a screen and the audio messages are presented to the user over an audio system, usually a set of headphones for privacy although a loud speaker could be used. The user's responses on the keyboard are analyzed by a logic unit which keeps track of the present location of both the audio and visual tapes and can be set to activate a proctor call signal and halt further system operation when error limits are reached or the user wants assistance. The logic system can also store digital data recorded on the audio tape and, depending on the keys operated by the user in response to the audio or visual presentations, can control movement of both tapes to new starting points thereby giving program branching capability. The digital data recordings on the audio tape are also used to activate the logic system when the visual tape is to be advanced to the next frame.

Figure 1:
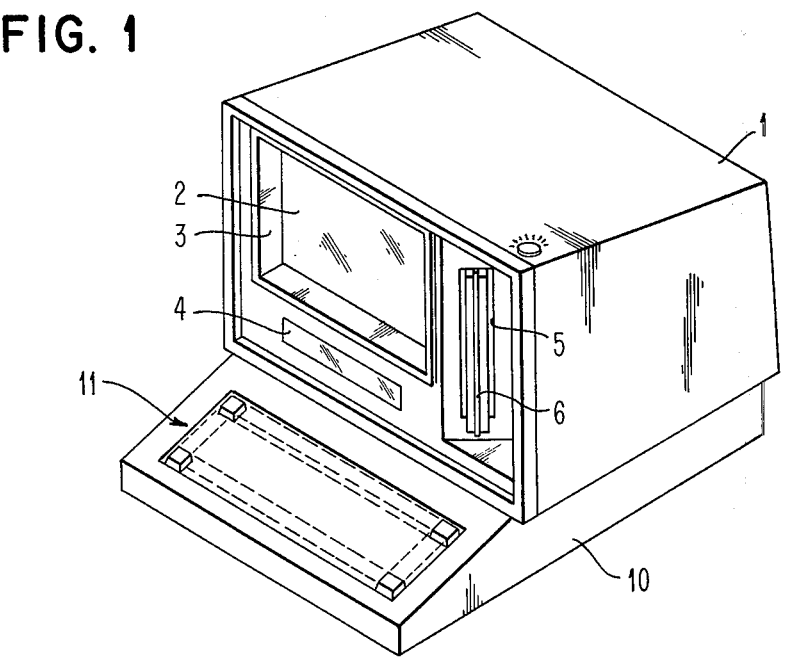
FIG. 1 is an isometric view of the exterior of the preferred embodiment of the invention.

More specifically, referring to FIG. 1, a cabinet 1 has a viewing screen 2 in a bezel 3 on its front surface. An alpha-numeric display panel 4 is mounted below bezel 3 and can be used to display up to 16 alpha-numeric characters. As described herein, the display is a so-called gas panel having a matrix of discharge points for each character display. The cabinet 1 also has an opening 5 to receive a double tape cassette 6 containing the visual and audio material and control signals. A base 10 below cabinet 1 has a sloping upper front face which contains a conventional type keyboard 11 having numeral and alphabet keys, punctuation and some control keys. Base 10 also contains the electronic logic circuits for controlling the optical projector and the tape movements of both of the cassette tapes.

Figure 2:
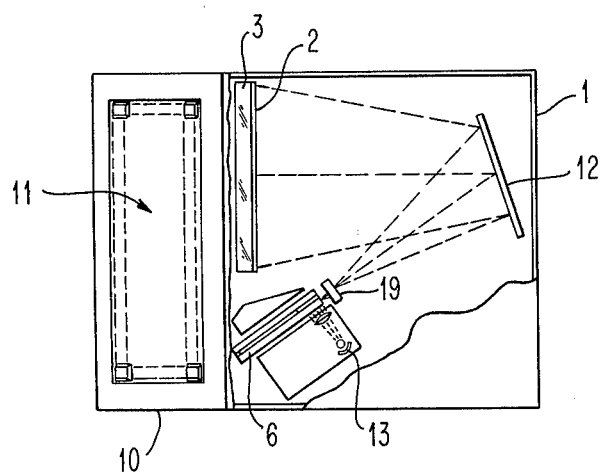

The optical path for projection from the cassette 6 is shown in FIG. 2 and includes a mirror 12 near the back of cabinet 1. A projection lamp 13 with appropriate condensing lenses and a shutter is mounted in cabinet 1 at the right side of cassette 6 and projects light through an opening 16, see FIG. 10, in the side of cassette 6 onto a mirror 17 in the cassette and then through a film 18 in the cassette. The light from the film then goes to a lens system, diagrammatically indicated at 19, which focuses the light via mirror 12, FIG. 2, onto screen 2. The audio tape 20 in the other half of cassette 6 is a commercial unit and is driven by a conventional capstan and motor drive mechanism indicated at 21 in FIG. 10. The tape is sensed by a conventional read head 22 mounted in the drive mechanism 21. The tape can be driven in either direction at a high speed and at a low speed in a reading direction, all speeds being selected under control of logic signals and a solenoid as will be more completely described later.

The cassette 6 is a double unit in which the film part 25, FIG. 10, is a modified commercial unit. The film strip 18 is wound on two arbors 27 and 28 and around two idler pulleys 30 and 31 rotatable in brackets 32 and 33. The brackets 32 and 33 are pivoted on pins 35 and 36, and are spring urged counter clockwise and clockwise respectively. The film 18 passes from one arbor, say 27, over pulley 30 and across a backing plate 38, where it is engaged by the sprocket teeth of a reversible stepping motor drive indicated generally at 39. The drive unit 39 has aligning pins 40 engagable in holes of plate 38 to align the cassette and one of which will, when the cassette is in position, disengage the tooth of a latch 41 from engagement with a sprocket hole of the film. The film then passes over a flanged roller 43 and across a film gate carrying the mirror 17 to the other idler 31 and to the other arbor 28. The film is driven in either direction by motor 39 which pulls it off one arbor and it is kept wound on the take-up arbor by a flexible band 45 which goes around roller 43 into contact with the film wound on both arbors 27 and 28 and then around two rollers 46 and 47. The unwinding of film 18 from one arbor will drive the band 45 which will drive the film 18 wound on the other arbor to take up an equal amount of tape. The audio part of the cassette is unmodified from the commercial embodiment and lacks the drive openings and the mirror parts, and uses instead a capstan driver 21 which engages roller 43 to drive the tape in one or the other direction. The audio part also uses tape guides similar to idler rollers 30 and 31, but fixed in the cassette rather than being spring pressed.

ELECTRONIC LOGIC UNIT

The electronic controls for the above-described hardware are located in the base section 10 and since their physical embodiment is of no patentable importance, have not been shown physically. The controls have the function of moving the visual film and audio tapes for projection and reading respectively. The film is only projectable and has no control function. However, the individual film frames are counted in an electronic counter so that the controls are always aware of the position of the film. On the audio tape, the messages are arranged in serial fashion on each of three parallel channels. Associated with each of the three parallel channels is another channel on which there is stored digital characters. These digital characters control film stepping so that it is coordinated with the audio messages; start an internal interval timer stepping at a predetermined rate; electronically unlocks the keyboard for use, and signal the logic unit when a particular audio message is finished. Another channel has tone bursts of a predetermined frequency to be used by the logic unit in keeping track of tape position at all times. A selection of one of the three channel pairs for playing is obtained via a displacement address that is part of the digital block data read into a buffer storage. One channel contains all of the digital data blocks for all three channel pairs.

In operation, when a cassette is inserted, the controls first run both film and tape backwards until an initial position is reached on each. Thereafter, the audio tape is started in motion, and the projection lamp is activated. The digital character channel will cause film movement and display of the visual images on the film as the audio tape is being reproduced and an associated control data block will be stored in a buffer register. At the end of the message, it is expected that the controls will stop both film and tape and await an action by the user, e.g., operation of one or more keys of keyboard 11. The storage buffer is in the nature of a shift register and will have a variable number of different instructions stored therein from the tape and depending on the data entered from the keyboard, one of these instructions will be performed. The instructions will usually be to advance or return either or both tape and film to a definite message number and film number and will then start the unit for another message and/or display.

The keyboard 11 is the user's response mechanism. The keyboard has the facility for generating a response to questions by operation of one of five multiple choice buttons and also has an alpha-numeric response capability for one or more characters of response. For single character answers, as well as for multiple character applications, such as spelling or arithmetic answers, the total response is entered on the keys and is displayed on display 4. When the user is satisfied that the answer is the way he wants it, he operates the key "START" of the keyboard to terminate the entry and allow the system to check the answer given by comparing it with all permissible answers.

The logic system also contains a group of counters which allows the checking of a response and controls adaptive branching as a function of the response. There are five displayable program counters, all of which can be individually incremented and/or reset and tested at any time to establish a branching scheme. For example, a test of 10 questions may be given with each correct answer causing an incrementing of counter 4 and incorrect answers incrementing counter 5. At the end of the test, counter 4 is compared with an acceptable number, say 7, and a high, low, or equal decision is made. Equal and high may allow continuation, but a low reading will cause counter 5 to be looked at to see how many incorrect answers were given and determine whether a loop back through the questions will be a sufficient remedy or whether there are too many skipped questions, in which case, a different entry point may be branched to. Alternatively, counter 5 may be used to count the number of passes through the test and be used to set a proctor call light after a limit is reached.

DETAILED DESCRIPTION

Figure 3:
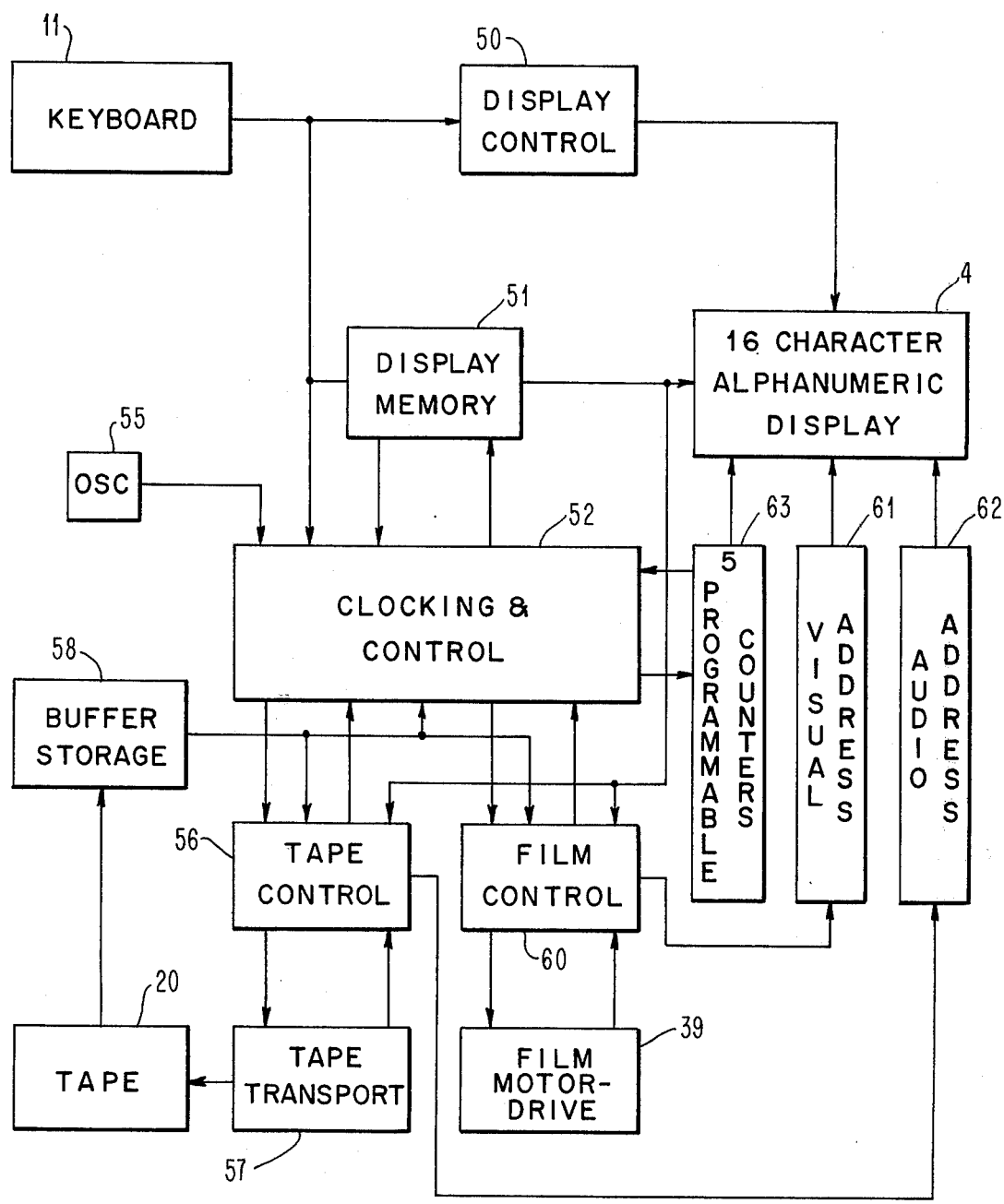
FIG. 3 is a top view of the interior of the embodiment showing the optical projection path from the film cartridge to the screen.

The overall cooperation of the electronics section is shown in FIG. 3 wherein the keyboard 11 is directly connected to the display control 50 to enable proper entering of data into and clearing of the 16 character display 4. The data from keyboard 11 also goes to a display memory 51 for storage and to the clocking and control section 52 which will use the entered data to determine branching and other control actions. An oscillator 55 provides the clocking control with a source of timing information. A tape control 56 determines the motions needed for the tape transport unit 57 to present the desired part of the audio tape 20 for reading. The digital part of the data from tape 20 is stored in a set of buffer registers in buffer storage 58. For the control of film 16, a film control 60 is connected to clocking control 52 and issues instructions to the film motor drive 39. Both tape control 56 and film control 60 can be set to transfer the present tape and/or film position to the audio address and visual address registers 61 and 62 for showing on display 4. The control unit 52 also has control over the 5 programmable counters 63 and can have them presented on display 4.

Figure 4:
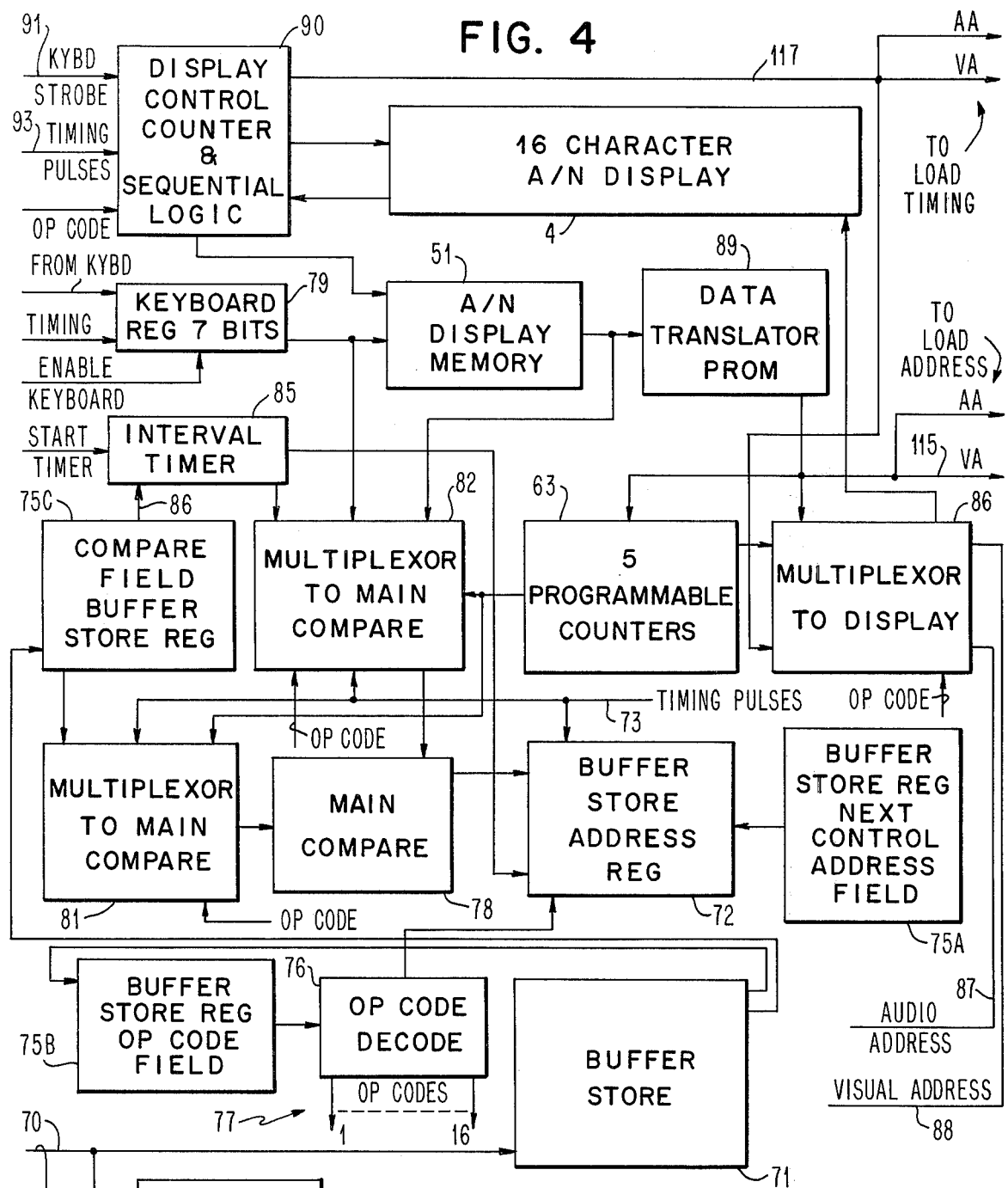
FIG. 4 is a schematic diagram showing the connections of the integrated circuit units of the control electronics.

FIG. 4 shows the control circuitry wherein a serial data input from one track of the audio tape is received on an input line 70 and is stored in a random access buffer storage 71 to form a variable control program for the system. Each time an audio message is played, the digital data block associated with that message is automatically read into the buffer store 71 to overlay previously stored data to form a new set of data in storage. The data received over line 70 is checked for validity in a cyclic redundancy checker 74 which provides a signal on the valid data output line so long as data blocks which include a redundancy check part are received without errors. conventionally, such checkers use shift registers with data feedback connections to receive and shift input data signals. One word of those stored in buffer store 71 is selected for storage in a buffer store register 75 by address register 72 which is normally incremented by timing pulses on a line 73 but may also be selectively altered under control of the next control address field register 75A of store register 75 when program branching is to be performed. Another portion 75B of storage register 75 holds the operation code field part of the active program instruction word and this code will be decoded in decoder 76 into a signal on one of the 16 op code lines 77 to control system operation. The decoder 76 also controls the buffer store address register to indicate whether the address register should be incremented at the end of an operation or should be reloaded with the next control address from register 75A.

If the particular operation being performed may result in a branch to one of several instruction words in buffer store 71 as determined by the high-low-equal condition of a main compare circuit 78, the instruction code from decoder 76 will gate with the output of compare 78 to determine the order or orders of address register 72 which are to be incremented. Comparison in the compare 78 will be between the compare field part 75C of the buffer store register 75, or one of the programmable counters 63 on one hand with a value in the keyboard register 79, with a value in the display memory 51 or with one of the programmable counters 63 or the interval timer on the other hand. The selection of the factors to be compared is by gating in the selected inputs to multiplexors 81 and 82 which feed the two inputs of compare 78 under control of the outputs of the op code decoder 76 and the timing pulses on line 73. An interval timer 85 may be provided to limit the time allowed for responses and is connected to the multiplexor 82 for actual time used comparisons and to buffer store register 72 to cause branching to a new program routine if a set time limit is exceeded. The interval timer is reset by reloading a new number as a result of a special bit being on in those instructions allowing timer use. The data for timer load is obtained from the compare field buffer store register 75C.

The display unit 4 is a commercial gas panel display unit having the capacity for displaying 16 alphanumeric characters. It is controlled to show data by the display multiplexor 86 which is set by the op codes decoded from decoder 76 to present the data representing the display memory 51 holding data entered from keyboard 79, the data for all of the programmable counters 63, the address of the present block of the audio records, from lines 87 or the present film number of the visual display from lines 88. The data in display memory 51 is translated in data translator 89 before it is passed to multiplexor 86. The display control counter and sequential logic 90 are controlled by timing pulses on line 93 by the keyboard strobe, line 91 and by op codes from decoder 76 to provide a scan sequence to the display 4; to sequentially enter keyboard characters into the proper ordinal position, and to address the display memory when a string analysis is required on a constructed keyboard response.

The components represented by the blocks of FIG. 4 are mainly commercial units manufactured by independent manufacturers and available on the open market. The components used in one embodiment of the invention were:

| Texas Instruments Co. Part Number | Components |
|---|---|
| SN 7475 | Registers 79, 75A, 75B, 75C |
| SN 7485 | Main Compare 78 |
| SN 7486 | Cycle Redundancy |
| SN 74164 | Checker 74 |
| SN 7489 | A/N Display Memory 51 |
| SN 7493 | Interval Timer 85 |
| SN 74151 | Multiplexors 81, 82, |

-continued

| Texas Instruments Co. Part Number | Components |
|---|---|
| SN 74157 | 86 |
| SN 74155 | Op Code Decoder 76 |
| SN 74196 | Programmable Counters 63 |
| SN 74197 | Buffer Store Address Register 72 |
| Burrough's Corp. SSD 1000-0030 | Display 4 |
| Intel Corp 1601 | Data Translator 89 |
| U.S. Pat. No. 3,582,892 Juliusberger et al, June 1, 1971 | Buffer Store 71 |

TIMING CIRCUITS

Figure 5:
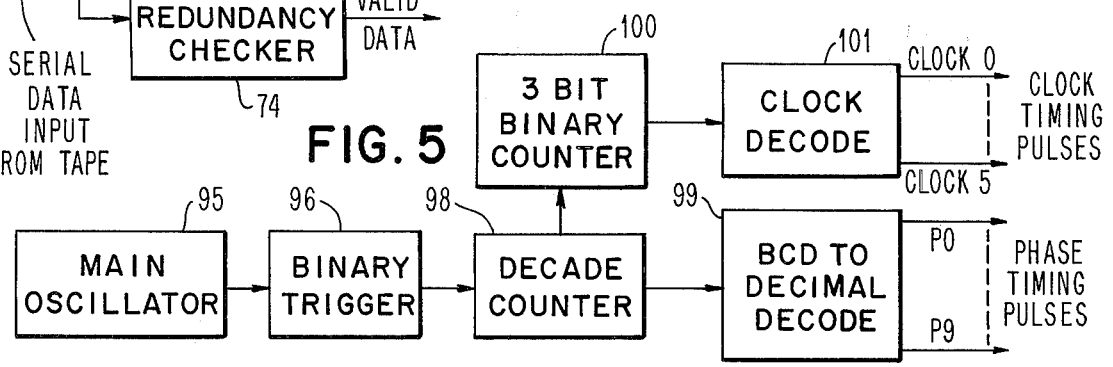
FIG. 5 is a schematic diagram of the clock timing and phase timing pulse generators.

The circuit for generating the clock timing and phase timing pulses for the display system is shown in FIG. 5 and comprises a main oscillator 95 which drives a binary trigger 96 generating a square wave output at one-half the oscillator frequency. The output of binary trigger 96 operates a decade counter 98 which resets itself after every ten counts and whose output drives a BCD to decimal decoder 99 to provide the ten PO–P9 phase timing pulses. The longer clock pulses are generated by a three bit binary counter 100 which is supplied pulses from the output of decade counter 98 and resets itself every six input pulses. A clock decoder 101 senses the settings of counter 100 and generates sequential pulses on the clock timing output lines.

In the preferred embodiment, the circuit blocks are commercially available units sold by the Texas Instruments Co. and are:

| Circuit Block | TI Part No. |
|---|---|
| Oscillator 95 | SN 74123 |
| Trigger 96 | SN 7496 |
| Decade Counter 98 | SN 7490 |
| Decimal Decoder 99 | SN 7442 |
| Binary Counter 100 | SN 7492 |
| Clock Decoder 101 | SN 74155 |

AUDIO CIRCUITS

Figure 6:
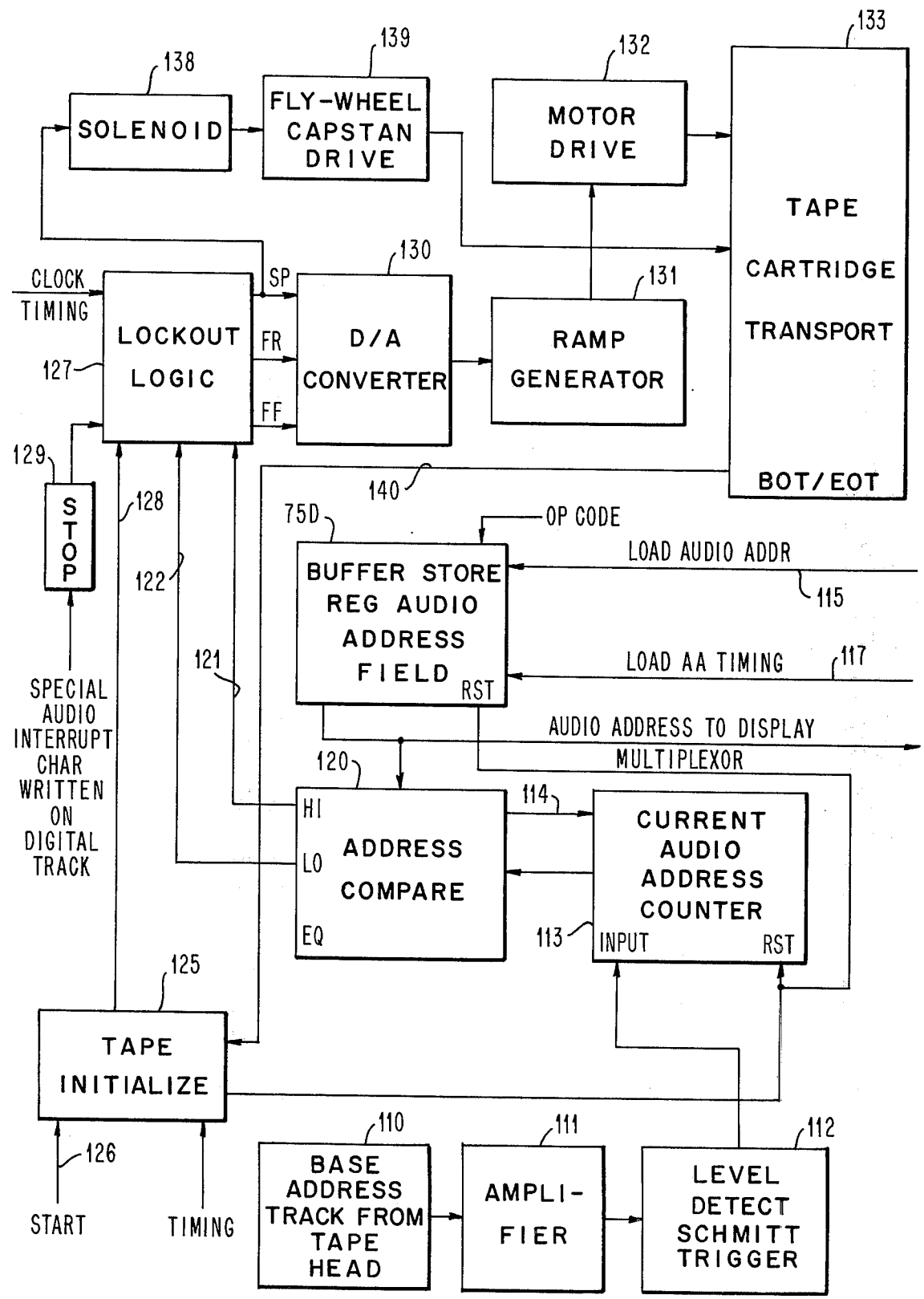
FIG. 6 is a connection diagram for the motion controls for the audio tape cartridges.

FIG. 6 shows the interconnections for controlling the motion of the audio tape 20 in cassette 6. The base address tape head 110 receives tone burst pulses from the audio tape 20 and passes the signal to amplifier 111. The level of the signal from amplifier 111 is detected and shaped by a Schmitt trigger circuit 112 which pulses a current audio address counter 113. The circuits are effective in either direction of tape motion and at any tape speed to provide incrementing or decrementing signals to the counter 113 so that the location of the audio tape may be kept current.

Counter 113 is set to count up or down by means of a mode input control line 114. The signal on this input line is generated by the state of the address compare circuits 120. If the compare between the address stored in the buffer store register audio address field 75D and the current audio address in counter 113 is high, then the count mode of counter 113 is set to increment or decrement the value in counter 113 to approach the desired value stored in the buffer store audio address field 75D.

The audio address field of the buffer store register 75D may be set from the buffer store 71 as an instruction word is read therefrom or it may be set to an audio address presented on lines 115 from the data translator 89 (FIG. 4) to represent a keyboard data input. The op codes decoded by decoder 76 (FIG. 4) and the load audio address timing signal presented from the sequential logic circuits 90 over line 117 determine when an audio address is to be loaded from lines 115 into register 75D. The address compare 120 will compare the settings of register 75D with the current audio address counter 113 to indicate on lines 121 and 122 whether the address in register 75D is higher or lower than that in counter 113 which will indicate the direction the tape should be moved to present the next programmed audio message.

The audio tape is initialized at its starting position by the tape initialize circuits 125 which are activated by the start signal on line 126 and a clock timing signal to start a restoration of the tape 20 to its fully wound position with a resetting of counter 113 to a zero value. A lockout logic circuit 127 receives the initialize signal from intializer 125 on line 128, the high and low signals on lines 121 and 122 and a stop signal from stop unit 129 together with the clock timing signal to determine the direction and speed of motion of tape 20. Stop unit 129 is a detector to look for a particular bit combination on the digital character channel of the tape and then stop tape feed pending further control over logic 127. The output of logic 127 is instructions for fast tape movement, either forward or reverse and for slow forward speed. These instructions, slow play (SP), fast forward (FF), and fast reverse (FR), are received in the digital to analog converter 130 for conversion into analog signals which are applied to ramp generator 131 to control the voltages applied by motor drive 132 to the commercial tape cartridge transport 133. The SP signal from logic 127 is also applied to solenoid 138 which engages the turning capstan drive shaft 139 of drive 21, FIG. 10, with the tape 20. The tape cartridge transport 133 also contains tape end sensing devices such as contacts closed by conductive parts of the audio tape 20 at the start and finish of the recorded material on the tape or photo detectors to sense a clear leader tape section. The beginning and end of tape signals are transferred over a line 140 to the initialize unit to indicate to it that a tape has been initialized and that the return drive action can be terminated.

The commercial units used in the logic blocks of FIG. 6 are as follows.

| | |
|---|---|
| Amplifier 111 | Texas Instrument Co. SN 72747 with discrete resistors and capacitors. |
| Schmitt Trigger 112 | TI Co. SN 72747, SN 7413, SN 7400, SN 7402, SN 7404. |
| Address Counter 113 | TI Co. SN 74190 |
| Address Compare 120 | TI Co. SN 7485 |
| Buffer Store Register 75D | TI Co. SN 7475, SN 74157 |
| Tape Initialize 125 | TI Co. SN 7400, SN 7402, SN 7404 |
| Lockout Logic 127 | TI Co. SN 7400, SN 7402, SN 7404 |
| D/A Converter 130 | TI Co. SN 7405, SN 72747 with discrete resistors |
| Ramp Generator 131 | TI Co. SN 72747 with discrete resistors and capacitors |
| Motor Drive 132 | TI Co. SN 7274 with discrete resistors and capacitors and power transistors |
| Stop Unit 129 | SN7430 |
| Solenoid 138, Capstan Drive 139 | Added parts to make 133 work properly at slow speeds |
| Cartridge Drive 133 | 3M Co. Model DCD-3 |

FILM CONTROLS

Figure 7:
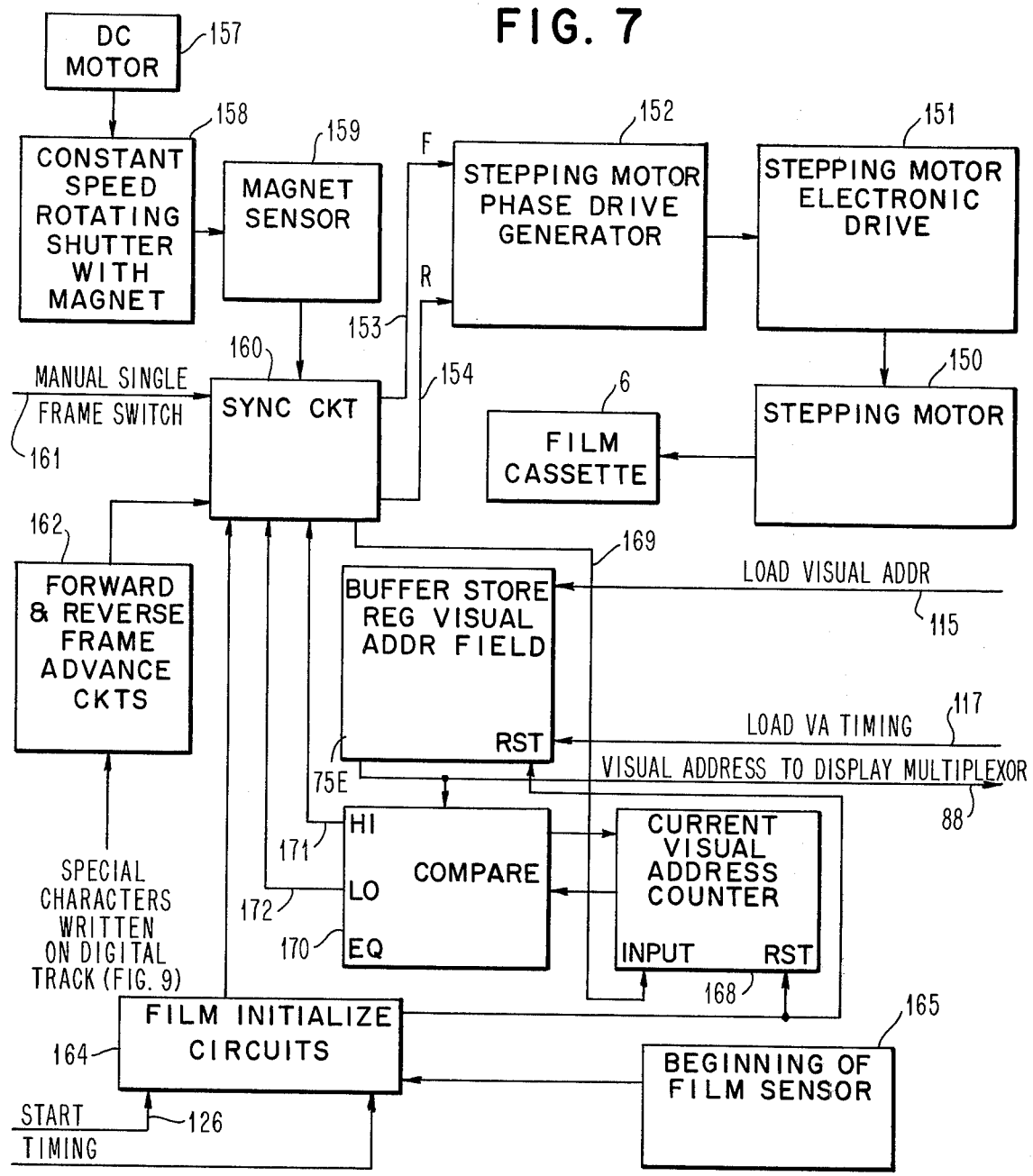
FIG. 7 is a similar diagram for the optical film drive.

The motion controls for the visual film 18 in cassette 6 are shown in FIG. 7. The film drive 39, FIG. 10, uses a conventional stepping motor 150 energized by a driver circuit 151 which is in turn controlled by a drive generator 152 settable for forward or reverse film movement by signals on lines 153 and 154 respectively. A DC motor 157 drives a rotating shutter 158 to block off the light from lamp 13 to the film 18, FIG. 1, during the time the film 18 is moving. The shutter carries a magnet which passes by a sensor 159 to indicate the start of the light cut off period of shutter rotation.

A synchronizing circuit 160 receives signals from sensor 159 to initiate film movement when required and is also controlled by a single cycle switch over line 161 to enable manually controlled film movement. The sync circuit is also controlled for automatic movement by special characters written on the digital character channel of audio tape 20, the characters being decoded by a decoder 162 to signal the sync circuits 160.

The film 18 may also be controlled for movement to any selected frame by other inputs to sync circuit 160. At the start of a user's session, a signal on the start line 126 with a timing signal will set the film initialize circuit 164 to call for a high speed reverse movement of film 18 and this setting will stay until a sensor 165 detects that film 18 is at its frame one.

Control over the film 18 during use of the unit is effected by the visual address part 75E of the buffer store register which can be set from the keyboard display memory 51 and translator 89 over lines 115 or from a selected word in buffer storage 71 to indicate a desired visual frame. The actual frame position of film 18 is indicated by a counter 168 which can be incremented or decremented by frame signals from the sync circuits 160 over leads 169 and can be reset to 0 by the initialization circuits 164 at the start of a user's session. A compare circuit 170 receives the settings of register 75E and of counter 168 and depending on the high or low output signal on lines 171 and 172 respectively, the sync circuits will be set for forward or reverse motion of the film 18. Film motion can be anything from a single frame at a time to 24 frames per second. Frame stepping in instruction delivery mode is solely dependent on the number of and rate of frame advance characters written on the digital character channel associated with each audio message channel of tape 20. When high speed film motion is required, the sync circuits 160 will move the film at a one for one shutter speed. In such high speed movement, it is desirable to prevent projection to screen 2 and this is performed by the projection lamp dousing control in FIG. 8. The projection lamp 13 is driven from a power source through a silicon controlled rectifier 175 which is fired by a single shot 176 driven at the power line frequency. The single shot 176 provides a lower than 100% duty cycle to the SCR gate which in turn reduces lamp voltage and brightness. When the lamp is to be doused, a control signal on line 177 from a clock timing pulser 178 will deactivate the single shot 176 and reduce lamp 13, brightness to where an image is not visible on screen 2.

Figure 8:
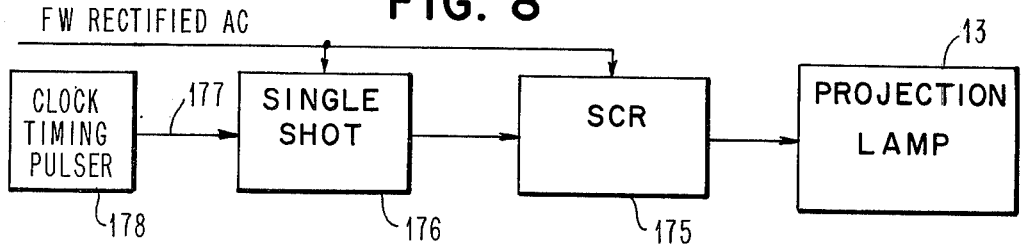
FIG. 8 is the dimming control over the projector lamp.

The commercial units used in the blocks of FIGS. 7 and 8 are as follows:

| | |
|---|---|
| Stepping Motor 150 | Hayden Co. Cat. No. 9904-112-05001 |
| Stepping Motor Drive 151 | Hayden Co. Cat. No. 9904-131-03003 |
| Drive Generator 152 | TI Co. No. SN 7493 |
| Magnet Sensor 159 | Electro Co. No. 58388 |
| Sync Circuits 160 | TI Co. Nos. SN 7400, SN 7402, SN 7404, SN 7474 |
| Decoder 162 | TI Co. SN 7430 |
| Buffer Register 75E | TI Co. Nos. SN 7475, SN 74157 |
| Compare 170 | TI Co. No. SN 7485 |
| Counter 168 | TI Co. No. SN 74190 |
| Initialize Circuits 164 | TI Co. Nos. SN 7400, SN 7402, SN 7404 |
| Film Sensor 165 | TI Co. No. L138 |
| Single Shot (FIG. 8) 176 | TI Co. No. SN 74123 |

AUDIO TRACK SELECTION

The audio tape 20 is sufficiently wide to accommodate three sets of recorded messages on tape 20. The selection of the active tape track is controlled by the track field part 75E of the buffer storage register and this field is decoded by a decoder 180 to put track select signals on leads 181 and 182. There are two electronic switches 183 for digital data and 184 for audio data, each to select one pair of the three digital or three audio tracks. These switches are conventional circuits formed of a transistor for each of the input lines with the three transistors for the same type of track having a common load and with the transistors for the tracks which are to be inactive biased by the signals on lines 181 and 182 to a non-conductive condition. The switches 183 and 184 receive all of the digital and audio signals respectively and pass the selected signals onto amplifiers 185 and 186. The digital data from amplifier 185 is passed to the data decoder part 187 of the audio tape drive 133 which is responsive to special characters and sends the detected ones to the special character decode circuits for program use. The special characters detected are: 1 ) Stop Audio — sent to stop circuits 129, FIG. 6; 2)Forward Frame Advance — to circuits 162, FIG. 7; 3)Reverse Frame Advance — to circuits 162, FIG. 7; 4) Enable Keyboard — to keyboard 79, FIG. 4; 5) Start Timer — to timer 85, FIG. 4. For the audio tracks, the message on the track selected by switch 184 and amplified by amplifier 186 is passed through power amplifiers 188 to a speaker or ear phones 189 for presentation to the user.

Figure 9:
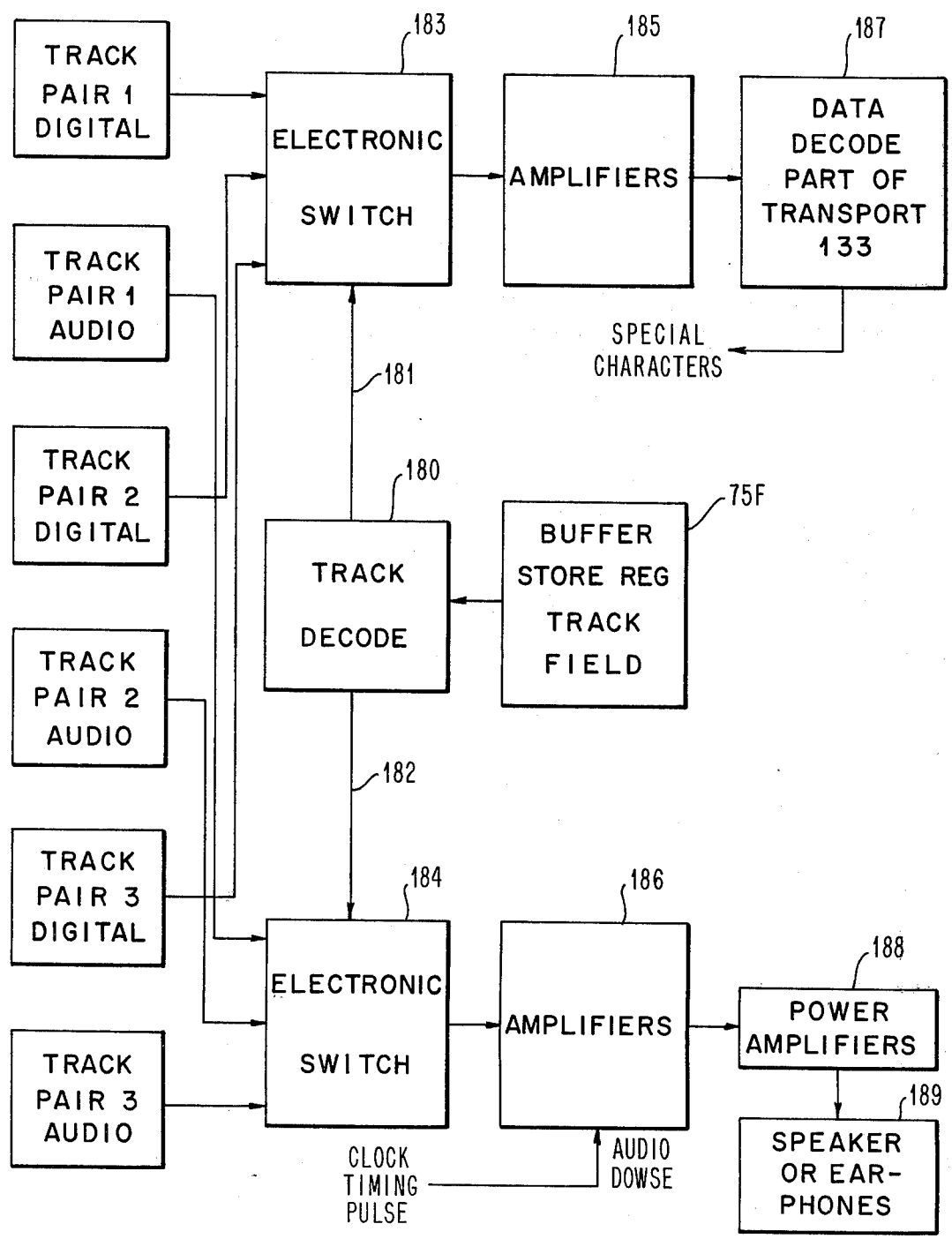
FIG. 9 is a diagram of the audio tape read-out controls.

The commercial components used for the logic blocks of FIG. 9 are:

| Logic Block | Component |
|---|---|
| Store Register 78F | TI Co. No. Sn 7475 |
| Decoder 180 | TI Co. Nos. SN 7408, SN 7404 |
| Amplifiers 185, 186 | TI Co. No. SN 72747 |

OPERATION OF THE SYSTEM

To operate the system, a user will select a cassette for the subject to be studied and will insert it into the opening 5 of casing 1. Depression of the START key will rewind both tape and film to the start positions and will then advance both to frame 1 and start feeding of the audio tape. The film will be advanced as required by the digital signals on the audio tape. At the end of any audio message block, the tapes can be stopped with a specific image on the screen and some reply required. A reply can be put in by operation of one of the 5 answer keys or by operation of keys of the keyboard to set a plurality of characters into the display 4. An operation of the START key will now restart operation of the unit and depending upon a comparison of the student's reply with a correct reply, the program will continue on or will branch to a new audio and/or visual address for continuation of the subject or remedial action as set out by the programmer.

There are a plurality of op codes which have been defined and implemented in the device. Four instructions are "Branch on Response " with 5-way, 4-way, 3-way, and 2-way branches depending upon the number of response keys which are allowed to be active. In each instruction, the system halts until a response key is operated, the instruction address is then updated by the number of the operated key, the instruction word at that updated address is brought into the buffer storage register 75 and the system starts up again to move the tape and film to new locations and continue operations. A "Branch Unconditional " instruction will update the instruction address to branch a new instruction word at the completion of the audio segment. The "Branch on Compare & Return" will compare the response character from the keyboard with the character set in the instruction word register 75 to branch to the next instruction for a wrong answer or to a new instruction address in register 75 for a correct response.

The four "Branch on Compare " instructions are similar to the above "Branch on Response " instructions except that the branch is to a new instruction address for a correct answer which compares with that in the register 75C or to the same new instruction address plus 1, 2, 3, or 4 respectively due to operation of a corresponding answer key. The "Proctor Call and Branch" instruction is used when the student has become so confused that he requires special attention. At this instruction, the system turns on the light to call the proctor and stops. When the proctor starts the system by a key, the operation starts at a new instruction address to inform the proctor what is wrong or what remedial action is needed.

The two instructions "Compare Right (or Left) Chain " are used to compare a sequence of characters entered from the keyboard into the display with characters stored in a chain of instruction words. The display characters will be compared starting from the right or left with the correct characters set in the successive instruction words. Any incorrect comparison will branch to a new instruction location which may contain another character for comparison with the display character. These instructions are useful where different forms of an answer, e.g., A. Lincoln or Abe Lincoln or Pres. Lincoln etc., are equally acceptable.

"Compare Program Counter " will compare the addressed program counter with a value in the compare field of register 75. The address register may be incremented by zero, one, or two depending upon a low, equal, or high result of the comparison. The "Transfer, Reset" and "Transfer, Increment" op codes are for program counter control and will reset or increment one or both of the program counters.

It should be noted that in each instruction there is a next control address field and the first step in each operation is to replace the present instruction address with the next instruction address from the instruction word. This abililty to step to a new instruction at any address of the buffer storage performance of the instruction gives a wide range of branching ability and also the op codes contain film drive instructions which permit the film to be driven one step at each occurrence of a control indicia on the audio tape, or to be driven at one fourth, three fourths, or one times the speed of operation of the film shutter 158. Generally, each op code will control the selection of a new tape location for both tapes and will then allow the audio tape message to be presented as soon as both tapes are present at their commanded index positions.

The above description of a preferred embodiment of the invention is specifically detailed to enable a complete specification of the embodiment and is not to be taken as limiting the range of equivalents as many variations in components are possible without affecting the basic functions and operations of the overall system. The scope of the present invention is set out in the appended claims and not by the specific features of the preferred embodiment.

What is claimed is:

1. An audio-visual device of the type described having a film tape with projectable images thereon, projector devices, a film drive, and a counter selectively energizable by said film drive to maintain a count indicative of the film image at the projecting position of the projector device, an audio tape having a plurality of separate messages thereon in one or more channels, said tape also including at least one channel having indicia indicating the start of each message and a following block of device control information for each message, a read head for each channel of said audio tape, an audio tape drive and a second counter selectively energizable under control of said start of message indicia to maintain a count indicating the identification of the audio message present at the read head, a pair of settable indicators, one for each tape and each to indicate a desired tape position of the associated tape, two comparators, one for each tape, to compare the desired tape position for the corresponding tape with a present tape position, a drive controller for each tape, each drive controller energized by its related comparator to actuate its tape drive in a direction to move the associated tape toward the desired position, a control data storage device connected to said read head for the control information channel to retain device control information as read from said audio tape, a plurality of user selectable response devices, means under control of said response devices to cause transfer of related device control information action from said information storage device to said settable indicators thereby causing movement of either or both of said tapes to response dependent positions and a character display service, a character storage means, character entry devices selectively operable by a user to enter character indicia into said character storage means for control of said display device, a start key and circuits controlled by said start key to successively compare character indicia stored in said storage means with character indicia in said device control information stored in said control data storage device.

2. An audio-visual device as set out in claim 1, and including therein an additional group of selectably operable counters, means controlled by certain of said response devices when operated to actuate said counters, and a switching multiplexer under control of said transferred device control information to transfer character representations from said selectably operable counters, or from said first and second counters to said character display device.

\* \* \* \* \*